United States Patent
Sun et al.

(10) Patent No.: US 8,717,291 B2
(45) Date of Patent: May 6, 2014

(54) MOTION SENSITIVE GESTURE DEVICE

(75) Inventors: Albert C. Sun, Hsinchu (TW);
Chungming Glendy Sun, Hsinchu (TW); Ying-Che Lo, Hsinchu (TW);
Shyh-Hong Tseng, Hsinchu (TW);
Shyh-Shyan Liao, Sindian (TW);
Hsin-Tang Chien, Hsinchu (TW)

(73) Assignee: AFA Micro Co., Hsinchu (TW)

( * ) Notice: Subject to any disclaimer, the term of this patent is extended or adjusted under 35 U.S.C. 154(b) by 899 days.

(21) Appl. No.: 12/575,377

(22) Filed: Oct. 7, 2009

(65) Prior Publication Data
US 2011/0080339 A1 Apr. 7, 2011

(51) Int. Cl.
*G09G 5/08* (2006.01)

(52) U.S. Cl.
USPC ............................ 345/158; 715/700; 715/863

(58) Field of Classification Search
USPC .............. 345/156, 157, 158, 163; 463/37, 38; 715/700, 701, 702, 863
See application file for complete search history.

(56) References Cited

U.S. PATENT DOCUMENTS

| | | | |
|---|---|---|---|
| 5,596,656 A | 1/1997 | Goldberg | |
| 5,982,352 A | 11/1999 | Pryor | |
| 6,084,572 A * | 7/2000 | Yaniger et al. | 345/159 |
| 6,375,572 B1 * | 4/2002 | Masuyama et al. | 463/43 |
| 6,603,420 B1 | 8/2003 | Lu | |
| 6,750,801 B2 | 6/2004 | Stefanik | |
| 7,123,180 B1 | 10/2006 | Daniell et al. | |
| 7,259,756 B2 | 8/2007 | Park et al. | |
| 2009/0121894 A1 | 5/2009 | Wilson et al. | |
| 2009/0213077 A1 * | 8/2009 | Bailen | 345/164 |
| 2009/0320123 A1 * | 12/2009 | Yu et al. | 726/16 |
| 2010/0066664 A1 * | 3/2010 | Son et al. | 345/156 |
| 2010/0095251 A1 * | 4/2010 | Dunko | 715/863 |
| 2010/0207871 A1 * | 8/2010 | Reponen et al. | 345/156 |
| 2010/0302139 A1 * | 12/2010 | Luiro et al. | 345/156 |
| 2011/0205156 A1 * | 8/2011 | Gomez et al. | 345/157 |

FOREIGN PATENT DOCUMENTS

EP 0661620 A1 7/1995

OTHER PUBLICATIONS

Lam, Alan H.F., et al., MIDS: Micro Input Devices System Using MEMS Sensors, Proc. of the 2002 IEEE/RSJ, Int'l. Conf. on Intelligent Robots and Systems, Oct. 2002, 6 pages.
Allan, Roger; MEMS on the Move: Motion Sensors for the Masses; www.electronicdesign.com; ED Online ID #15656; Jun. 7, 2007; 3 pages.
Johnson, R. Colin; InvenSense spins first pitch-and-yaw MEMS gyro; www.eetimes.com; Apr. 30, 2008; 2 pages.
Layton, Julia; How Remote Controls Work; How Stuff Works; 2005; 4 pages.

* cited by examiner

*Primary Examiner* — Tom Sheng
(74) *Attorney, Agent, or Firm* — James F. Hann; Haynes Beffel & Wolfeld LLP

(57) ABSTRACT

A wireless wrist mouse, used with an apparatus including a display having a cursor, has a body mountable to a user's hand/wrist by wrist mounting structure. A motion sensor and motion circuitry are carried by the body and are operably connected to one another. The motion circuitry includes a library of command motions. The motion circuitry is constructed to generate first and second command signals corresponding to the first and second command motions when the body has been moved in predetermined manners for receipt by and operation of the apparatus. The first command signals correspond to cursor movement directions for controlling movement of the cursor over the display. The second command signals correspond to control functions for the apparatus. In some examples, the motion sensor comprises a MEMS sensor. In some examples, the motion sensor comprises a translational, rotational, and vibrational movement motion sensor.

30 Claims, 7 Drawing Sheets

Double click

Draw cursor

MOTION SENSITIVE GESTURE DEVICE

CROSS-REFERENCE TO OTHER APPLICATIONS

This application is related to U.S. patent application Ser. No. 12/337,312, filed 17 Dec. 2008, entitled HOLD-FREE GESTURE-BASED INTERFACE USING MULTIPLE SENSOR SPACES; and U.S. patent application Ser. No. 12/466,692, filed 15 May 2009, entitled LASER POINTER AND GESTURE-BASED INPUT DEVICE. This application is also related to U.S. patent application Ser. No. 12/556,947, filed on 10 Sep. 2009, entitled REMOTE CONTROL AND GESTURE-BASED INPUT DEVICE.

BACKGROUND OF THE INVENTION

The present invention relates to a motion sensitive gesture device, including a movement-based wireless wrist/finger mouse usable with a computer or other device with a mouse-controllable cursor.

Computers are typically controlled using a keyboard, including alphanumeric keys and special function keys, and a computer mouse, typically referred to as a mouse. The mouse is used to control the placement of a cursor on a computer screen by moving the mouse over an opposing surface supporting the mouse. The mouse typically has one or more buttons or other input devices typically used to select a function associated with the placement of the cursor. Although the mouse is a very useful and powerful tool, it has its limitations. For example, in some situations the person using a portable computer may not have an opposing surface that the mouse can be supported on and moved over.

A wireless mouse is a mouse that commonly communicates with the controlled apparatus, such as a computer, using infrared light (IR) command signals or more typically radio frequency (RF) command signals. The controlled apparatus includes a receiver, such as an IR light sensor or an RF receiver, adapted to receive the command signals.

SUMMARY

A first aspect of the invention is directed to a wireless wrist mouse for use with an apparatus of the type including a display having a cursor. The wireless wrist mouse includes a body and wrist mounting structure by which the body is mountable to a user at the user's hand or near the user's wrist. A motion sensor is carried by the body. Motion circuitry is carried by the body and is operably connected to the motion sensor. The motion circuitry includes a library of command motions. The library of command motions includes first command motions and second command motions. The motion circuitry is constructed to generate first and second command signals corresponding to the first and second command motions when the body has been moved in predetermined manners for receipt by and operation of the apparatus. The first command signals correspond to cursor movement directions for controlling movement of the cursor over the display. The second command signals correspond to control functions for the apparatus. In some examples, the motion sensor comprises a MEMS sensor. In some examples, the motion sensor comprises a translational, rotational, and vibrational movement motion sensor.

A second aspect of the invention is directed to a method for controlling an apparatus using a wrist mouse, the apparatus comprising a display having a cursor. The method can be carried out as follows. A wireless wrist mouse is mounted to a user at a chosen hand or at or near a chosen wrist of the user. The wrist mouse comprises a body, a motion sensor and motion circuitry, the motion sensor and motion circuitry carried by the body. The motion circuitry comprises a library of first and second command motions. The first command motions are command motions corresponding to cursor movement directions for controlling movement of the cursor over the display. The second command motions are command motions corresponding to control functions for the apparatus. The wrist mouse is moved in a chosen manner. The movement of the wrist mouse is sensed by the motion sensor. Whether or not the sensed movement corresponds to any of the command motions is determined. If the sensed movement corresponds to any of the first command motions, then a cursor movement command signal corresponding to such first command motion is generated. The cursor movement command signal is received by the apparatus causing the cursor on the display of the apparatus to move. If the sensed movement corresponds to any of the second command motions, then a control function command signal corresponding to such second command motion is generated for receipt by the apparatus. In some examples, the moving step comprises tapping the wrist mouse to create a second command motion. In some examples, tapping the wrist mouse comprises a first tapping of the wrist mouse, pausing, followed by a second tapping of the wrist mouse. In some examples, the moving step comprises a first tapping sequence to the wrist mouse with the wrist mouse at a first location, moving the wrist mouse to a second location, and a second tapping sequence to the wrist mouse with the wrist mouse at the second location. In some examples, the command motion for a first command signal exceeds one or both of a threshold velocity or a threshold acceleration.

A third aspect of the invention is directed to a method for controlling an apparatus using a tap motion sensitive gesture device. The method can be carried out as follows. A tap motion sensitive gesture device is supported by a chosen body part of a user, the gesture device comprising a body, a motion sensor and motion circuitry. The motion sensor and motion circuitry are carried by the body. The motion circuitry comprises a library of command motions. The gesture device is moved in a chosen manner. The moving step includes tapping the gesture device to create vibrational movement of the gesture device. The motion sensor senses the vibrational movement of the gesture device. The movement sensing step comprises sensing vibration created by the tapping. Whether or not the sensed vibrational movement corresponds to any of said command motions is determined. If the sensed vibrational movement corresponds to any of the command motions, then a command signal corresponding to such command motion is generated for receipt by an apparatus.

Regarding the third aspect of the invention, in some examples, the supporting step is carried out so that the chosen body part is a chosen hand and wrist of the user. In some examples, tapping the gesture device comprises tapping the chosen hand of the user on a surface. In some examples, tapping the gesture device comprises tapping the body of the gesture device. In some examples, tapping the gesture device comprises a first tapping of the gesture device, pausing, followed by a second tapping of the gesture device. In some examples, tapping of the gesture device comprises a first tapping sequence of the gesture device with the gesture device at a first location; movement of the gesture device to a second location; and a second tapping sequence of the gesture device with the gesture device at the second location. In some examples, the first tapping sequence comprises at least one tap followed by a pause followed by at least one tap. In some examples, if the sensed vibrational movement does not correspond to a command motion, then control is returned to the sensing movement step. In some examples, the movement sensing is carried out using a MEMS motion sensor. In some examples, the movement sensing comprises sensing said vibrational movement in 3 degrees of freedom in translation in linear space. Some examples further comprise training the wireless gesture device to recognize a command motion associated with a command signal. Some examples further comprise training a user to move the gesture device in a predetermined manner corresponding to the command motion.

Again regarding the third aspect of the invention, in some examples, the mounting step is carried out with the body having a top and a bottom, and the gesture device moving step comprises initially orienting the gesture device so that the top is generally horizontal with the top facing upwardly. In some examples, the command motion for a first command signal comprises clockwise motion of the gesture device, said motion exceeding one or both of a threshold velocity or a threshold acceleration. In some examples, the command motion for a second command signal comprises counterclockwise motion of the gesture device, said motion exceeding one or both of a threshold velocity or a threshold acceleration. In some examples, the command motion for a third command signal comprises movement of the gesture device away from the user generally parallel to the user's forearm and hand, such motion exceeding one or both of a threshold velocity or a threshold acceleration. In some examples, the command motion for a fourth command signal comprises movement of the gesture device towards the user generally parallel to the user's forearm and hand, said motion exceeding one or both of a threshold velocity or a threshold acceleration. In some examples, the command motion for a turn on command signal comprises clockwise motion of the wrist mouse, such motion exceeding one or both of a first threshold velocity or a first threshold acceleration. In some examples, the command motion for a turn off command signal comprises counterclockwise motion of the wrist mouse, such motion exceeding one or both of a second threshold velocity or a second threshold acceleration. In some examples, the command motion for a zoom in command signal comprises movement of the wrist mouse away from the user generally parallel to the user's forearm and hand, such motion exceeding one or both of a third threshold velocity or a third threshold acceleration. In some examples, the command motion for a zoom out command signal comprises movement of the wrist mouse towards the user generally parallel to the user's forearm and hand, said motion exceeding one or both of a fourth threshold velocity or a fourth threshold acceleration.

Other aspects and advantages of the present invention are provided in the drawings, the detailed description and the claims, which follow.

DETAILED DESCRIPTION

Figure 1:
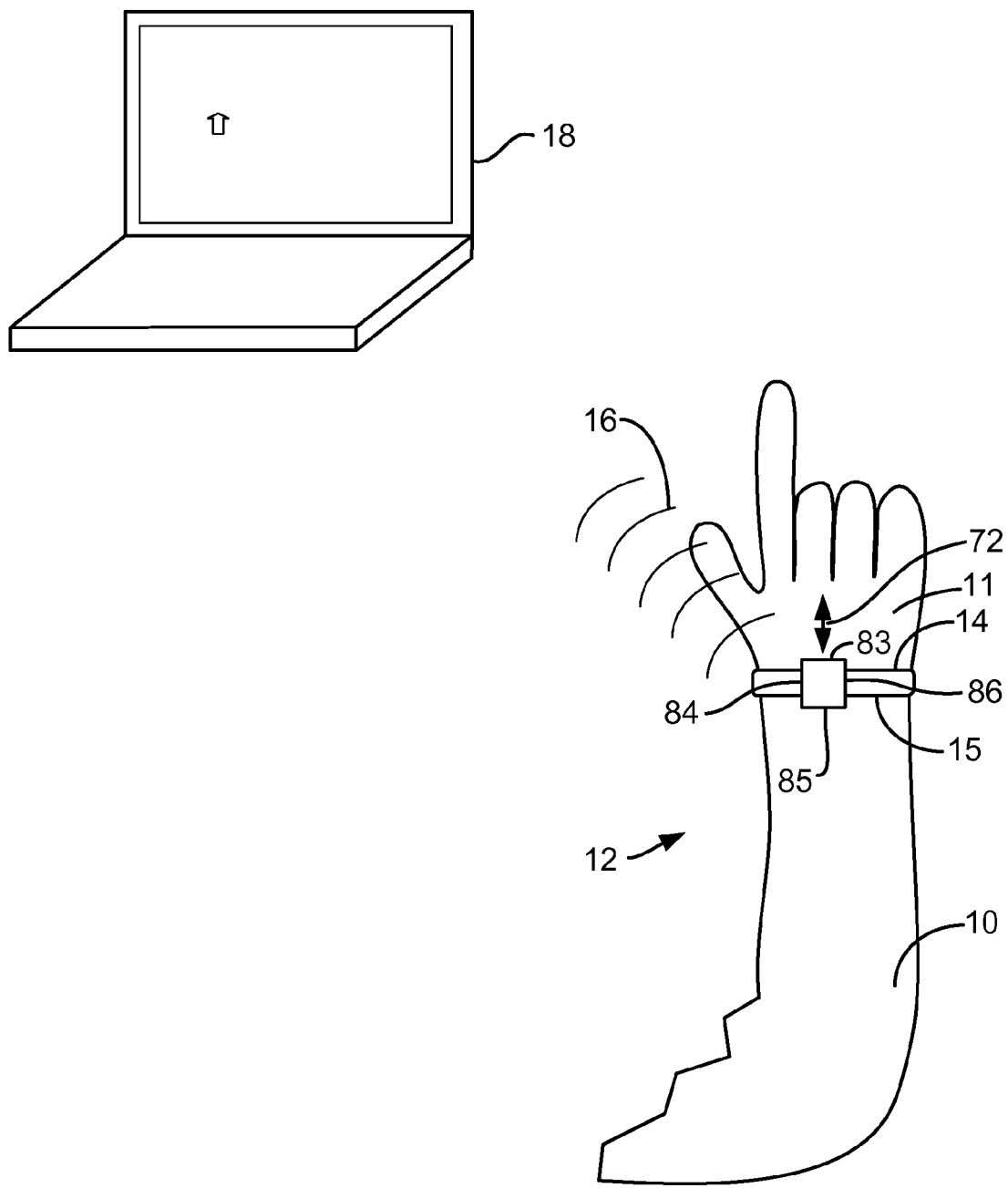
FIG. 1 is a simplified diagram of a wireless wrist mouse used in conjunction with a computer.

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figure 2:
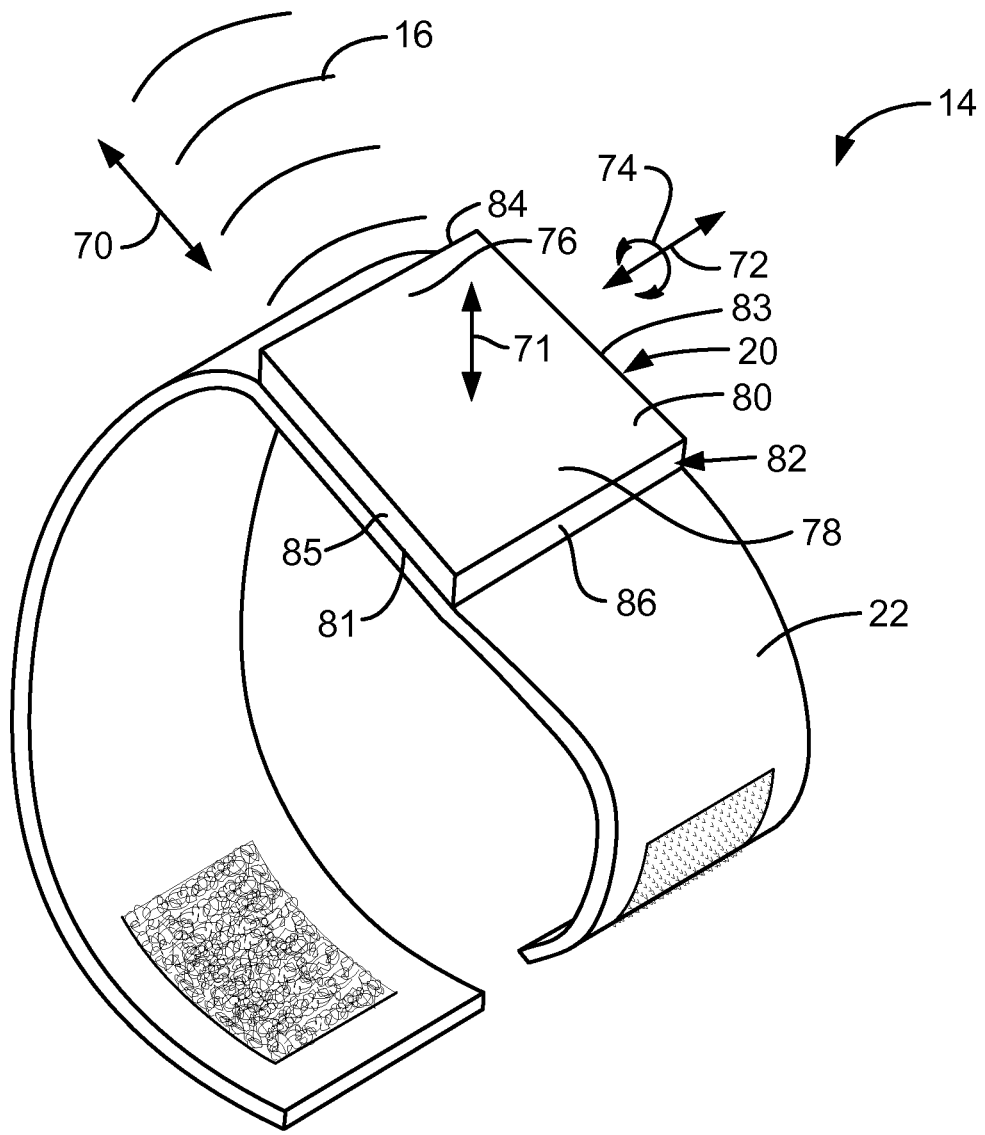
FIG. 2 is an enlarged view of the wrist mouse of FIG. 1.

FIG. 1 is a simplified diagram showing the forearm 10 and hand 11 of a user 12 to which a wrist/finger mouse 14 is mounted at or near the wrist 15 of user 12. Wrist/finger mouse 14 could also be configured for mounting to different parts of a user's hand, typically a finger. For ease of nomenclature, wrist/finger mouse 14 will typically be referred to as wrist mouse 14. Wrist mouse 14 is used to produce a command signal 16 to control an apparatus such as a computer 18 through receipt of the command signal 16 by a signal receiver, not shown, of the computer. Wrist mouse 14 includes a body 20, see FIG. 2, secured to a wristband 24 with a motion sensor 24 and motion sensitive circuitry 32, see FIG. 3, housed within and carried by body 20. This arrangement enables command signals 16 to be generated by appropriate movements of wrist mouse 14. This generation of command signals 16 through movement is discussed in more detail below. Motion sensitive circuitry 32 together with signal generator 30 is sometimes referred to as motion circuitry.

Command signals 16 can be any of a variety of wireless signals, and are typically RF command signals. Different conventional or unconventional communication protocols, such as wi-fi, Bluetooth or Zigbee, may be used. Motion sensor 24 preferably includes very small microelectromechanical systems (MEMS) sensors. In some examples, command signals 16 can be infrared command signals.

Upon movement of wrist mouse 14 through a particular motion corresponding to a particular command, such as "left click," motion sensor 24 causes motion sensitive circuitry 32 to create a "left click" input signal 28 to signal generator 30. Receipt of the "left click" signal causes signal generator 30 create a "left click" command signal 16 for transmission to the signal receiver of computer 18. The "left click" command signal 16 from signal generator 30 corresponds to the "left click" input signal created by a conventional mouse.

In this example, wrist mouse 14 includes a conventional on-off switch, not shown. That is, during conventional use of wrist mouse 14, the on-off switch is used to enable or disable the wrist mouse. The provision of an on-off switch helps to prevent unintended generation of command signal 16 by simply moving wrist mouse 14. In other examples, wrist mouse 14 has no on-off switch but remains in a standby mode awaiting a movement input similar to many conventional wireless mice.

Representative motion sensors 24 include inertial sensors and gyroscopes capable of sensing up to 6 degrees of motion, including translation on the x-, y- and z-axes, and rotation on the x-, y- and z-axes. The motion can be interpreted by breaking down the sensor data in displacement, velocity and acceleration spaces for both translation and rotation. Many sensors, sensing many axes and types of motion, can provide substantial information to be used for generating the desired command signal 16. In addition to translational and rotational movement, motion sensors 24 preferably also have the capability of sensing vibrational movement, which is commonly primarily translational movement, such as the type generated when a user taps on wrist mouse 14 with a finger or taps his or her hand on a surface.

Motion sensor 24 and motion sensitive circuitry 32 is preferably designed to create the same set of input signals 28 as are generated by a conventional mouse, including left click, right-click, double-click, two-dimensional cursor movement and scroll wheel type of cursor movement. Examples of additional input signals 28 that may be generated by motion sensor 24 and motion sensitive circuitry 32 include handwriting or letter recognition and computer program commands such as open a new e-mail, open a voice recognition program and open a new document.

For controlling computer 18, the input signals 28 capable of being generated by motion sensor 24 and motion sensitive circuitry 32 will typically be used to control conventional computer functions, such as opening programs, scrolling through documents, selecting portions of documents for copying, etc. A single motion sensor 24 can provide input in both linear and angular acceleration space, velocity space, and displacement space.

For the purposes of this specification, a MEMS sensor is any one of a class of sensors consisting of a unit that is small and light enough to be attached to a wrist mouse, and can be defined as die-level components of first-level packaging, and include accelerometers, gyroscopes, etc. Typical MEMS include an element that interacts with the environment, having a width or length on the order of 1 millimeter, and can be packaged with supporting circuitry such as an analog-to-digital converter, a signal processor and a communication port.

Representative MEMS suitable for the gesture-based wrist mouse 14 described herein include three axis accelerometers. In some examples, two two-axis accelerometers can be used instead of a three axis accelerometer. Other representative MEMS for the gesture-based systems described herein include gyroscopes, including capacitive or piezoelectric vibrating gyroscopes.

Motion sensitive circuitry 32 comprises data processing resources which provide for interpretation of the gesture data received from motion sensor 24 located on wrist mouse 14. The gestures are suggested in FIG. 2 and include lateral movements 70, longitudinal movements 72, rotary or circular movements 74, and up-and-down or vertical movements 71 perpendicular to the top 80 of body 20. The gestures can be further defined by, for example, smooth movements, short jerky movements and accelerating-to-a-stop movements. Other types of or directions of movement can also be used. Having such a library of movements corresponding to functions of or commands to computer 18 enables the user to provide such functions or commands without the need to position a mouse on a support surface.

For purposes of this application, lateral movements 70 will be considered Y axis movements, longitudinal movements 72 will be considered X axis movements and movements perpendicular to the top 80 of body 20 will be considered Z axis movements. Rotation of the user's hand to the right in FIG. 1, although such movements would not strictly be rotation about x-axis 72, may be referred to as clockwise roll or longitudinal or x-axis clockwise rotation. Similarly, rotation of the user's hand to the left in FIG. 1 may be referred to as counterclockwise roll or longitudinal or x-axis counterclockwise rotation. Movement towards the top of the page in FIG. 1 generally along x-axis 72, that is away from user 12 generally parallel to the user's forearm 10 and hand 11, may be referred to as forward movement, while the reverse movement, that is towards user 12 generally parallel to the user's forearm 10 and hand 11, may be referred to as backward movement.

Body 20 of wrist mouse 14 has a front end 76, a back end 78, a top or top side 80, a bottom or bottom side 81, opposite top 80, and a circumferentially extending edge 82 connecting the top and bottom. Longitudinal movements 72 are typically generally along an imaginary line extending between front end 76 and back end 78.

In some examples, the referenced directions, such as right, left, up and down, are defined assuming wrist mouse 14 is held at least at the beginning of a movement in a generally horizontal orientation with top 80 generally horizontal and facing upwardly. Other initial orientations are also possible. The forward and backward directions are in these examples relative to x-axis 72 extending through the front end 76 and back end 78 of the wrist mouse 14.

In some examples, motion sensitive circuitry 32 can sense up and down direction so that the wrist mouse 14 can be held in any attitude with regard to the up and down movement. The forward and backward movements and directions, corresponding to longitudinal movements parallel to or along x-axis 72, in such cases may be determined with reference to the front end 76 and back end 78 of the wrist mouse 14. The right and left lateral directions, corresponding to lateral movements parallel to or along y-axis 70, may be determined by the sensed up-and-down direction, the front end 76 and the back end 78 of the wrist mouse. Other schemes for determining orientation and movements may also be used.

Motion sensitive circuitry 32 can include a library of command emotions, that is a map database including the specifications of gestures to be used with wrist mouse 14, and a mapping of the gestures to specific input signals 28. For example, a pre-specified gesture in the database can be defined as a movement of wrist mouse 14 back and to the right; this gesture can be associated with the right click function. Wrist mouse 14 may include additional circuitry including a computer program that provides for an interactive learning process, by which the user is presented, such as on the screen of computer 18, with the specifications of a specific gesture for particular command or instruction. User 12 then makes, or tries to make, the specific gesture with wrist mouse 14 in an attempt to generate the particular command or instruction. This provides a learning loop in which the computer enables a user to learn a library of gestures for interaction with apparatus 18.

In some examples, the motion circuitry, that is motion sensitive circuitry 32 together with signal generator 30, is constructed to generate first command signals 16 corresponding to cursor movement directions for controlling movement of the cursor over the display of computer 18, and second command signals 16 corresponding to control functions for the apparatus. The apparatus control functions can include typical computer mouse control functions such as left click, right-click and scroll wheel movements, as well as other computer instructions. The cursor movement and control function command signals can be transmitted to computer 18 or other apparatus using, for example, low and high frequency carrier signals respectively.

One example of training computer 18 to recognize a new command can proceed generally as follows. The user enters a name for the new command into computer 18. A new command gesture is performed by the user so that wrist mouse 14 generates a new command signal 16. The user then checks computer 18 to confirm receipt of command signal 16 for the new command. Assuming computer 18 has received the command signal 16 for the new command, computer 18 generates a visual display of the new command gesture for review by the user. The user then repeats the performance of the new command and the checking of the computer until computer 18 generates and displays a composite new command gesture together with the name of the new command. Generation of the composite new command gesture indicates that the user has sufficiently consistently performed the new command gesture to enable it to be added to the library of command gestures.

An example of training a user to properly perform the gesture for an existing command can proceed generally as follows. The name for the command, such as left click, is entered into computer 18. Computer 18 then displays a visual representation and a verbal description of the command. The user then performs the command gesture. Computer 18 then checks to see if the performed command gesture is sufficiently close to the programmed command gesture. If it is, the training session is complete. If not, the user once again performs the command gesture and the computer checks the command gesture; the performance and checking of the command gesture is repeated until the performed command gesture is sufficiently close to the programmed command gesture to indicate that the command gesture has been properly learned.

In some cases, a user may decide to reprogram the computer so that the computer recognizes the user's command gesture as the proper command gesture for a particular command. For example, if the user has a difficult time performing the command gesture for right-click, the user can enter a command into the computer telling the computer that the command motion in the library for right-click is to be changed. The procedure for changing the command motion or gesture, discussed above regarding training computer 18 to recognize a new command, can then be followed.

A system as described herein can be implemented using sensors that describe motion of the sensor in space, including providing gesture data concerning up to 6 degrees of freedom, including 3 degrees of freedom in translation in linear space provided by an accelerometer and 3 degrees of freedom provided in rotation in angular space by a gyroscope. It is also possible, theoretically, to describe the displacement of an object in space using an accelerometer for all 6 degrees of freedom, or using a gyroscope for all 6 degrees of freedom. Using multiple spaces provided by sensing function with respect to up to 6 degrees of freedom, can enable a system to distinguish between complex gestures reliably and quickly. The gesture data produced during movement of the sensors, located on the wrist mouse, through a given gesture can be analyzed by displacement, velocity, acceleration in linear and angular spaces.

Tapping on body 20 of wrist mouse 14 causes an impulse response or vibration of the wrist mouse, and thus motion sensor 24 will produce high-frequency oscillation or noise that can be detected separately from lower frequency motions created when wrist mouse 14 is moved along straight and/or curved paths. This impulse response or vibration caused by tapping will often be collectively referred to in this application as tapping or the tap function. The tap function, can also be accomplished by tapping the user's hand, to which wrist mouse 14 is mounted, on a surface. The tap function can be used for a number of different purposes. For example the tap function can be used to replace one or more movements, such as the flick movement; this can be useful for individuals having limited ability to generate certain types of movements. The tap function can also be used to temporarily stop the generation of command signal 16 by causing wrist mouse 14 to go into a suspension mode, sometimes referred to as "go to sleep." Examples of the tap function include the following. A single tap on top side 80 from the user's other hand can mean go to sleep while a single tap on first, second, third or fourth edge segments 83-86 of circumferential edge 82 can mean wake up computer 18, turn on command mode, turn off computer 18, and turn off command mode, respectively.

The tap function can also be used to input a code, which had been programmed into computer 18, using a particular sequence of taps. A double tap followed by a short pause followed by a single tap on top side 80 could be used to select a particular computer program. In addition, the tap function can be used to enter a password to, for example, allow access to computer 18. The series of taps and pauses can have a musical or rhythmic aspect to help the user remember a particular sequence of taps. Accordingly, motion sensor 24 can respond to the vibrational movement caused by tapping wrist mouse 14 according to (1) where the wrist mouse is tapped, such as top side 80 or along circumferential edge 82, (2) the number of taps, and (3) any particular sequence of taps. The tap function is therefore a type of command gesture.

Another type of tap function, sometimes called tap with location, can be particularly useful for inputting a security code or other specialized input. With the tap with location function, a first sequence of taps are performed followed by movement of remote control 14 in a predetermined manner, followed by a second sequence of taps; additional movement and tap sequences can be used. For example, to make remote control 14 operational, the following tap with location security code could be required. Tap top side 80 twice, pause, and tap top side 80 twice again, move remote control 14 to the right approximately 6 inches followed by three taps.

Wrist/finger mouse 14 is intrinsically capable of use with movement in six dimensions. However, when wrist/finger mouse 14 is attached on human wrist or finger, it is believed that because of the ergonomic considerations, the monitoring of the movement of wrist mouse 14 may be, for practical purposes, limited to monitoring movements in four dimensions; specifically linear movement will contribute 3 dimensions, roll around x-axis 72 will contribute 1 dimension, but pitch around y-axis 70 and yaw around z-axis 71 are expected to be blurred by linear movement. However, even limiting movement to four dimensions is a vast improvement over a conventional computer mouse which is limited to two dimensions. In addition, in some examples, the tap function can be used to provide for six different tap type impulses corresponding to impulses applied to the top 80, bottom 81 and the four side edge segments 83-86. The great flexibility of the present invention may be especially useful for use with future three-dimensional display panels, especially with more advanced commands built-in.

A library of commands with corresponding gestures, and techniques for sensing the gestures is provided in the following table for a computer apparatus 18. Of course, the gestures listed can be mapped to a variety of command motions, different from those listed in this table. All of the presentation commands can be programmable. The ability to make any command programmable is especially helpful for a person with a disability hindering or preventing him or her from consistently making a desired movement with wrist mouse 14. Examples of various commands are illustrated in FIGS. 4A-4E.

Command Motion Library

| GESTURE NUMBER | COMMAND GESTURE NAME | MAPS TO PRESENTATION COMMAND | MOTION DETECTION PROCESS |
|---|---|---|---|
| 1. | Left and back movement | Left click | Motion to the left and back exceeding one or both of a threshold |

-continued

| GESTURE NUMBER | COMMAND GESTURE NAME | MAPS TO PRESENTATION COMMAND | MOTION DETECTION PROCESS |
|---|---|---|---|
| | | | velocity or a threshold acceleration |
| 2. | Right and black movement | Right-click | Motion to the right and back exceeding one or both of a threshold velocity or a threshold acceleration |
| 3. | Left and back movement, then right and forward movement, then left and back movement | Double click | Motion along each leg exceeding one or both of a first threshold velocity or a first threshold acceleration and below one or both of a second threshold velocity or a second threshold acceleration |
| 4. | Back movement, then right and forward movement, then forward movement | Begin drawing with cursor | Motion along each leg exceeding one or both of a first threshold velocity or a first threshold acceleration and below one or both of a second threshold velocity or a second threshold acceleration |
| 5. | Handwriting recognition icon | Handwriting recognition | Move cursor into a hand writing icon on the computer screen and click on icon to start hand writing recognition by moving wrist mouse along letter-shaped paths. |
| 6. | Single tap on top side 80 | Go to sleep | Vibrational movement caused by a single tap on top side 80, the vibrational movement exceeding one or both of a threshold velocity or a threshold acceleration |
| 7. | Tap with rhythm | For future expansion, such as for a password | Sequence of vibrational movements created by a series of taps with optional pauses, typically on a chosen side of the remote control, the vibrational movement for each tap exceeding one or both of a threshold velocity or a threshold acceleration |
| 8. | Tap with location | For future expansion, such as for a security code | Sets of taps/pauses with movement of wrist mouse between sets, the vibrational movement for each tap exceeding one or both of a threshold velocity or a threshold acceleration |
| 9. | Rotate right | Turns on wrist mouse | Rotate hand and wrist to the right (clockwise) |
| 10. | Rotate left | Turns off wrist mouse | Rotate hand and wrist to the left (counterclockwise) |
| 11. | Move forward | Causes image on display of computer to zoom in | Move wrist mouse away from the user generally parallel to longitudinal movement line 72 |
| 12. | Move backward | Causes image on the display of computer to zoom out | Move wrist mouse towards the user generally parallel to longitudinal movement line 72 |

Figure 3:
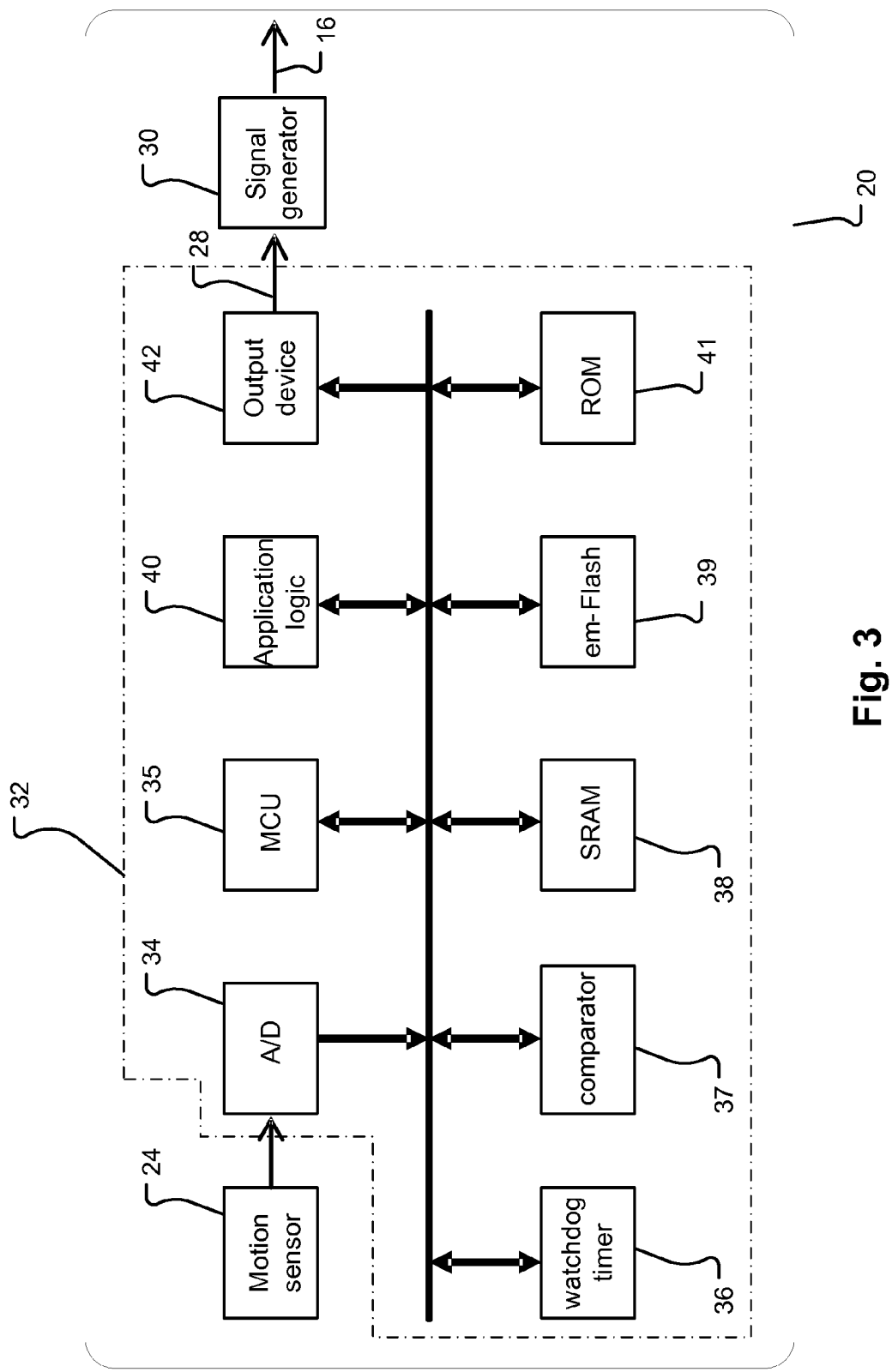
FIG. 3 is a block diagram showing the basic components constituting the motion circuitry of the wrist mouse of FIG. 1.
Figure 4A:
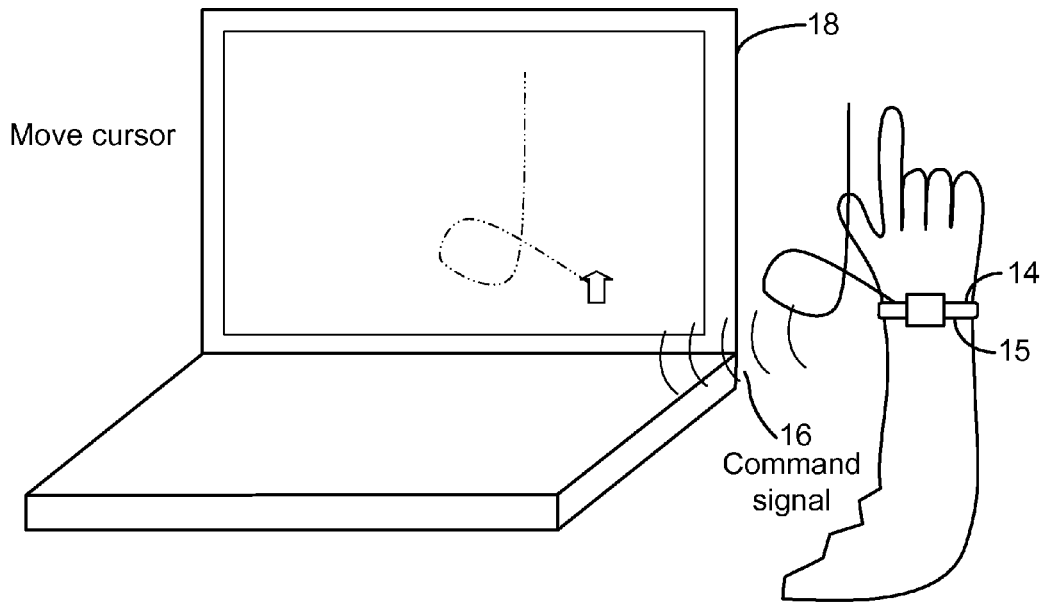
FIGS. 4A-4E illustrate several different commands appropriate for the wrist mouse of FIG. 1.
Figure 4B:
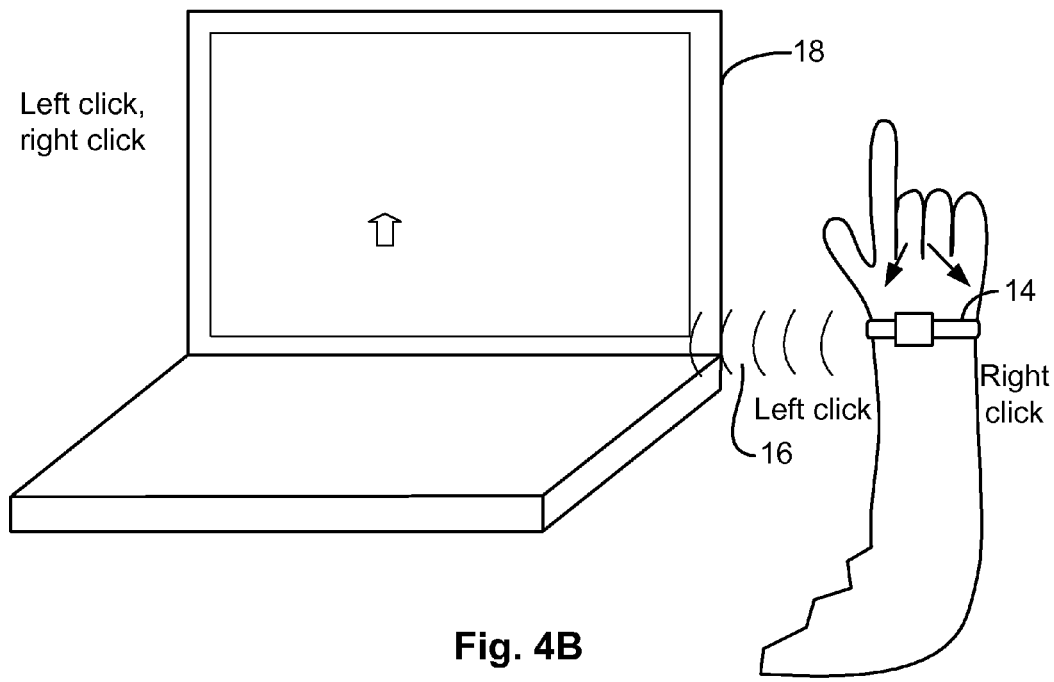
Figure 4C:
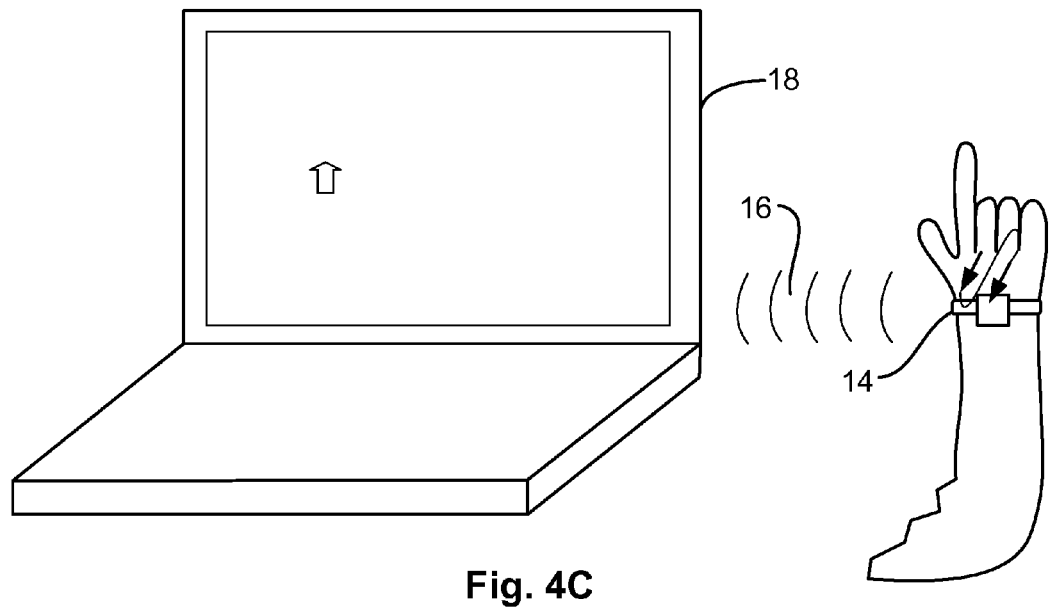
Figure 4D:
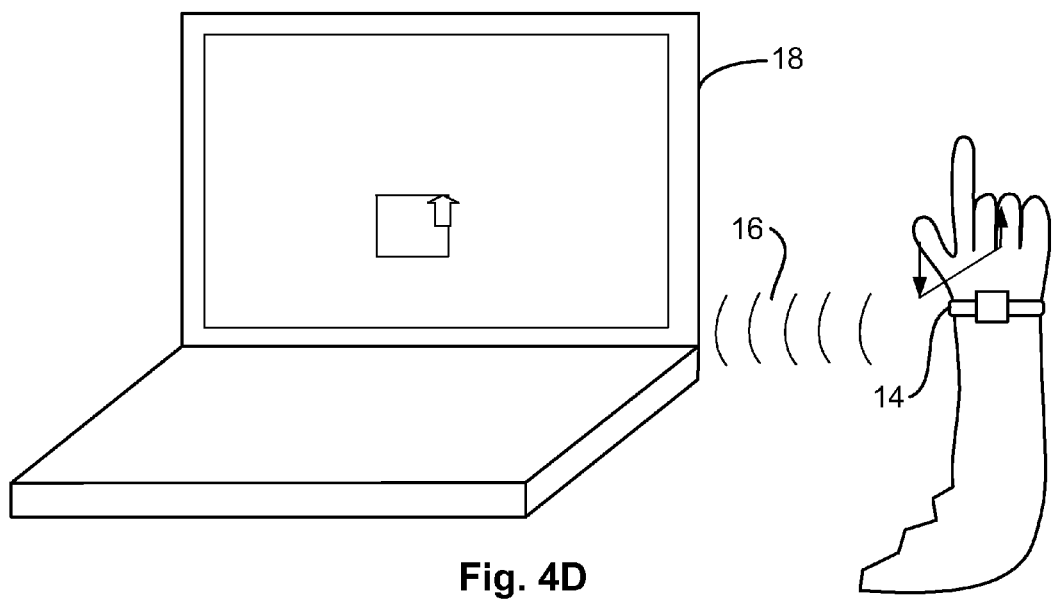
Figure 4E:
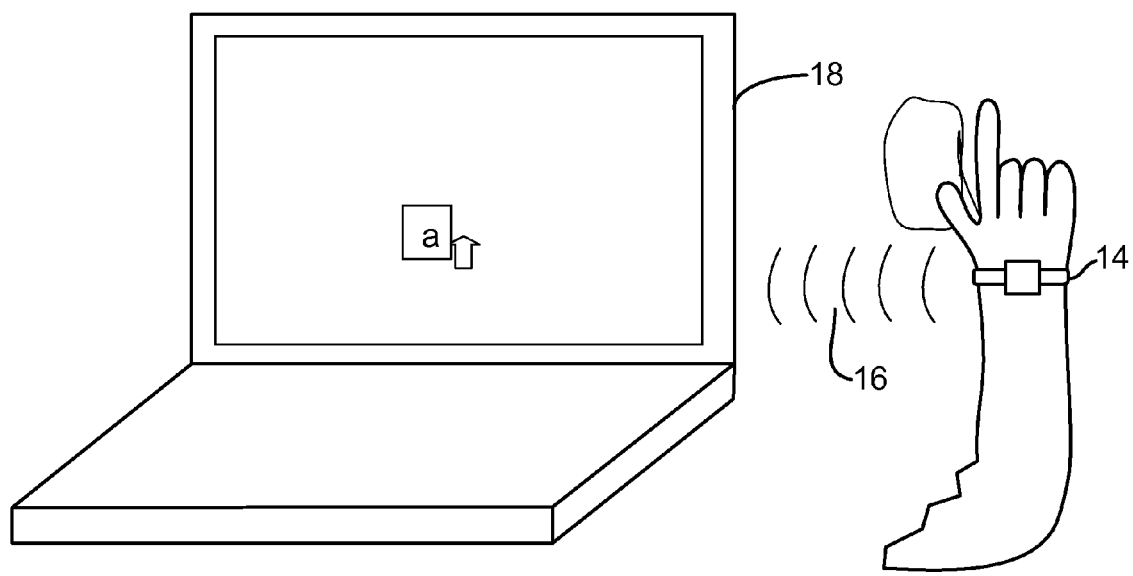

FIG. 3 is a block diagram of motion sensor 24, typical components of one example of motion sensitive circuitry 32, and a signal generator 30 mounted on or within body 20 of wrist mouse 14. Motion sensitive circuitry 32 together with signal generator 30 is sometimes referred to as motion circuitry. Motion sensor 24 is coupled to analog-to-digital conversion circuit 34. Alternative systems include more than one motion sensor 24. The conversion circuit 34 is coupled to a bus on which a microcontroller unit MCU 35 coordinates activity among a number of units, executing system firmware and coordinating processing with application logic for the gesture navigation. In the illustrated example, other units on the bus include a watchdog timer 36, comparator logic 37, for comparing input sequences of data indicating gestures or component motions of gestures that include a sequence of component motions, with stored sequences of data specifying the unique signatures for memorized gestures for component motions, SRAM 38 working memory used for example to store displacement, velocity and acceleration data for gestures as they are performed, embedded flash memory 39 to store a component motion database and application programs to support self-learning and calibration, any necessary application logic 40 to operate as glue logic or high speed logic in support of the gesture interpretation and navigation processes, in addition to that provided by the microcontroller unit, ROM memory 41 for storing instructions or other control data, and an output device 42 for providing input signals to signal generator 30. The watchdog timer 36 is operable to set time limits on the processes for interpreting gestures, to eliminate or recover from invalid commands.

Figure 5:
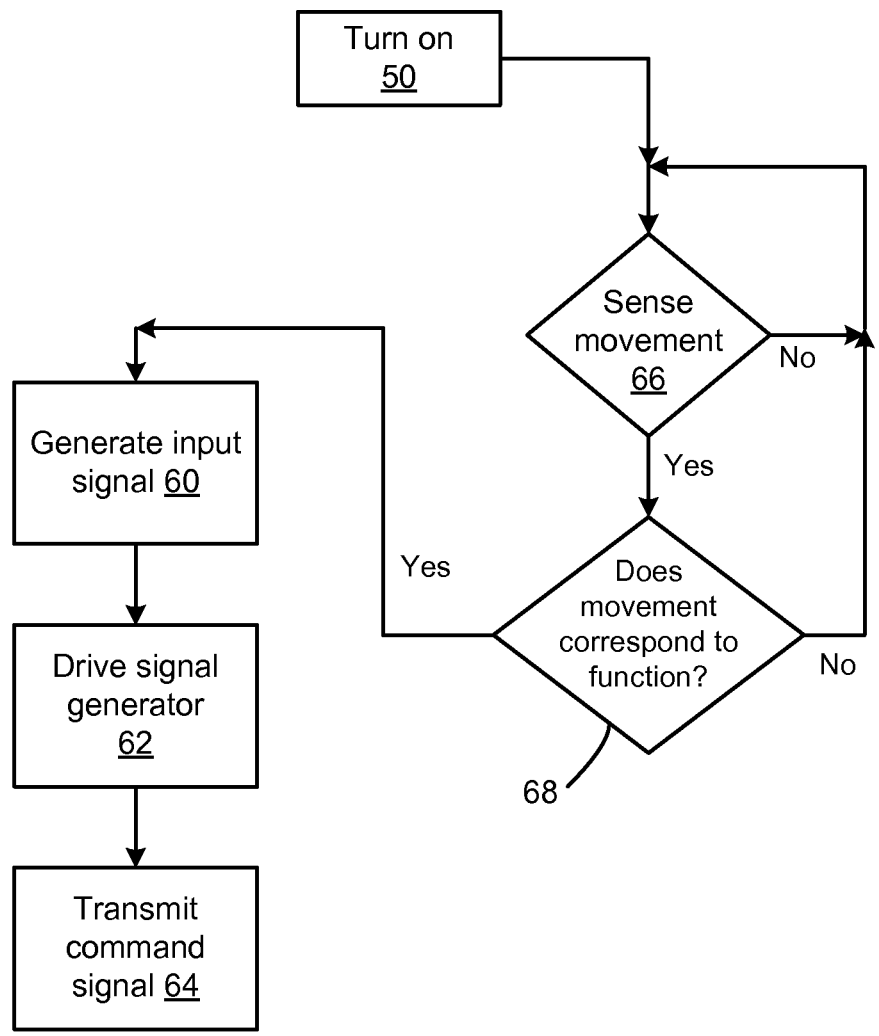
FIG. 5 provides a flow chart illustrating a method of operation for a wrist mouse as described herein.

FIG. 5 provides a flow chart showing a simplified operation sequence for wrist mouse 14. In this example the user first turns on wrist mouse 14 at 50. Of course if wrist mouse 14 is always on, this step is unnecessary. Motion sensor 24 carried by, typically within, body 20 of wrist mouse 14 is used to sense movement of the wrist mouse as at 66. If movement is not sensed, control is returned to the input of sense movement 66. If the answer is yes so that movement has been sensed, motion sensor 24 provides an appropriate signal to motion sensitive circuitry 32 which determines if the sensed movement corresponds to a predetermined function as at 68. If the answer is no, that is there is no appropriate correlation between the sensed movement and the library of command motions stored within motion sensitive circuitry 32, control is returned to the input of sense movement 66. If the answer is yes, motion sensitive circuitry 32 generates input signal 28 at 60 for driving signal generator 30 at 62. Signal generator 30 then transmits a command signal 16 to the signal receiver of computer 18 as at 64.

The preferred MEMS type motion sensors 24 are ultra light and very small so that they can be easily be a part of wrist mouse 14. This technology makes it possible to control the operation of apparatus 18 by a single and gesture without the need to hold anything. Also, sophisticated gestures can be utilized through sensing displacement, velocity, acceleration in both linear and angular spaces. The system is capable of learning user-defined gestures for customized user language and commands.

One of the advantages of the invention is that it is particularly suited for replacement of conventional hand-held mice. The space taken up by motion sensor 24 and motion sensitive circuitry 32 may be small enough so that these additional components can be incorporated into a relatively small body 20 so to minimize the bulk of wrist mouse 14. In addition, wrist mouse 14 can be programmed and otherwise modified for use with adaptive technologies for use by, for example, persons with disabilities to control or operate apparatus suitable for control using a computer mouse type of device. For example, temperature control for heating or cooling systems and the remote operation of light switches, automatic door openers, or motorized window/skylight coverings may be suitable candidates for control using a wrist mouse 14 for some users.

Wrist/finger mouse 14 has a number of advantages when compared to a traditional computer mouse. The ergonomics are better because there is a more natural link between hand/wrist movement and cursor movement with the invention. The instructions and corresponding movements can be more intrinsic than with a conventional computer mouse. For example, rotate right (clockwise) can correspond to wrist mouse on; rotate left (counterclockwise) can correspond to wrist mouse off. Move forward can correspond to zoom in; move backward can correspond to zoom out. Wrist/finger mouse 14 is intrinsically suited for rotation due to ergonomics. Considering future trends, in particular future 3-D display panels, wrist/finger mouse 14 is an intrinsically 3-D capable device so that it can cope with a 3-D display much more effectively than a conventional 2-D computer mouse. Further, because wrist/finger mouse 14 does not need to be grasped or held by the user, a more natural user-machine interface is achieved. Wrist/finger mouse 14 can prove to be a more powerful tool and can be more fun for the user than a conventional 2-D computer mouse.

The invention has been discussed with reference to a wireless wrist mouse. However, another aspect of the invention involves a tap motion sensitive gesture device, not necessarily a wrist mouse, that can be held like a remote control, or worn on or mounted to the hand, wrist, arm, head or other body part of the user. The movement of the tap motion sensitive gesture device involves tapping to create vibrational movement of the gesture device and typically also involves translational and rotational movement as well. In addition to being used as a computer mouse, the tap motion sensitive gesture device, as well as the wrist/finger mouse, can be adapted for use as an audiovisual system remote control, a television remote control, a control for digital home devices, a control for digital building related applications such as museum tours, and a remote control for adaptive technologies such as devices that operate light switches, automatic door openers, telephone answering machines, etc.

The above descriptions may have used terms such as above, below, top, bottom, over, under, et cetera. These terms may be used in the description and claims to aid understanding of the invention and not used in a limiting sense.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention.

Any and all patents, patent applications and printed publications referred to above are incorporated by reference.

What is claimed is:

1. A wireless wrist mouse, for use with an apparatus of the type comprising a display having a cursor, comprising:
   a body;
   wrist mounting structure by which the body is mountable to a user at the user's hand or at or near the user's wrist;
   a motion sensor carried by the body;
   motion circuitry carried by the body and operably connected to the motion sensor, the motion circuitry comprising a library of command motions;

the library of command motions comprising first command motions and second command motions, the second command motion comprising a tapping the body command motion created by tapping on the body; and the motion circuitry constructed to generate first and second command signals corresponding to the first and second command motions when the body has been moved in predetermined manners for receipt by and operation of an apparatus, the apparatus of the type comprising a display having a cursor, the first command signals corresponding to cursor movement directions for controlling movement of the cursor over the display, and the second command signals corresponding to control functions for the apparatus.

2. The wireless wrist mouse according to claim 1, wherein the command signals are computer command signals.

3. The wireless wrist mouse according to claim 1, wherein the motion sensor comprises a MEMS sensor.

4. The wireless wrist mouse according to claim 3, wherein the MEMS sensor is a three-axis MEMS motion sensor.

5. The wireless wrist mouse according to claim 3, wherein the MEMS sensor comprises at least a MEMS accelerometer.

6. The wireless wrist mouse according to claim 3, wherein the MEMS sensor comprises at least a MEMS gyroscope.

7. The wireless wrist mouse according to claim 1, wherein the motion sensor comprises a 6 degrees of freedom motion sensor for sensing movement of said motion sensor in 3 degrees of freedom in translation in linear space and 3 degrees of freedom in rotation in angular space.

8. The wireless wrist mouse of claim 1, wherein the motion sensor comprises a translational, rotational, and vibrational movement motion sensor.

9. The wireless wrist mouse of claim 1, wherein the second command signals comprise left-click, right-click and double-click command signals.

10. The wireless wrist mouse of claim 1, wherein the first command signals are lower frequency signals than the second command signals.

11. A method for controlling an apparatus using a wrist mouse, the apparatus comprising a display having a cursor, the method comprising:

mounting a wireless wrist mouse to a user at a chosen hand or at or near a chosen wrist of the user, the wrist mouse comprising a body, a motion sensor and motion circuitry, the motion sensor and motion circuitry carried by the body, the motion circuitry comprising a library of first and second command motions, the first command motions being command motions corresponding to cursor movement directions for controlling movement of the cursor over the display, and the second command motions being command motions corresponding to control functions for the apparatus;

moving the wrist mouse in a chosen manner;

the moving step comprising tapping on the wrist mouse body to create a second command motion;

sensing, by said motion sensor, said movement of the wrist mouse;

determining if the sensed movement corresponds to any of said command motions; and if the sensed movement corresponds to any of said first command motions, then generate a cursor movement command signal corresponding to such first command motion for receipt by an apparatus causing a cursor on a display of the apparatus to move; and if the sensed movement corresponds to any of said second command motions, then generate a control function command signal corresponding to such second command motion for receipt by the apparatus.

12. The method according to claim 11, further comprising: if the sensed movement does not correspond to a command motion, then return to the sensing movement step.

13. The method according to claim 11, wherein the mounting step is carried out with a wireless computer wrist mouse.

14. The method according to claim 11, wherein the movement sensing is carried out using a MEMS motion sensor.

15. The method according to claim 11, wherein the movement sensing step comprises sensing said movement in 3 degrees of freedom in translation in linear space and 3 degrees of freedom in rotation in angular space.

16. The method according to claim 11, wherein said second command motion corresponds to a mouse left click.

17. The method according to claim 11, wherein the movement sensing step comprises sensing vibration created by said tapping.

18. The method according to claim 11, wherein tapping the wrist mouse comprises a first tapping of the wrist mouse, pausing, followed by a second tapping of the wrist mouse.

19. The method according to claim 11, further comprising training the wireless wrist mouse to recognize a command motion associated with a command signal.

20. The method according to claim 11, further comprising training a user to move the controller in a predetermined manner corresponding to said command motion.

21. The method according to claim 11, wherein:
mounting step is carried out with the body having a top and a bottom; and
the wrist mouse moving step comprises initially orienting the wrist mouse so that the top is generally horizontal with the top facing upwardly.

22. The method according to claim 11, wherein said command motion for a first command signal comprises clockwise motion of the wrist mouse, said motion exceeding one or both of a threshold velocity or a threshold acceleration.

23. The method according to claim 11, wherein said command motion for a second command signal comprises counterclockwise motion of the wrist mouse, said motion exceeding one or both of a threshold velocity or a threshold acceleration.

24. The method according to claim 11, wherein said command motion for a third command signal comprises movement of the wrist mouse away from the user generally parallel to the user's forearm and hand, said motion exceeding one or both of a threshold velocity or a threshold acceleration.

25. The method according to claim 11, wherein said command motion for a fourth command signal comprises movement of the wrist mouse towards the user generally parallel to the user's forearm and hand, said motion exceeding one or both of a threshold velocity or a threshold acceleration.

26. A method for controlling an apparatus using a wrist mouse, the apparatus comprising a display having a cursor, the method comprising:

mounting a wireless wrist mouse to a user at a chosen hand or at or near a chosen wrist of the user, the wrist mouse comprising a body, a motion sensor and motion circuitry, the motion sensor and motion circuitry carried by the body, the motion circuitry comprising a library of first and second command motions, the first command motions being command motions corresponding to cursor movement directions for controlling movement of the cursor over the display, and the second command motions being command motions corresponding to control functions for the apparatus;

moving the wrist mouse in a chosen manner;

the moving step comprising tapping the wrist mouse to create a second command motion;

tapping the wrist mouse comprising a first tapping sequence to the wrist mouse with the wrist mouse at a first location;

moving the wrist mouse to a second location;

tapping the wrist mouse further comprising a second tapping sequence to the wrist mouse with the wrist mouse at the second location;

sensing, by said motion sensor, said movement of the wrist mouse;

determining if the sensed movement corresponds to any of said command motions; and if the sensed movement corresponds to any of said first command motions, then generate a cursor movement command signal corresponding to such first command motion for receipt by an apparatus causing a cursor on a display of the apparatus to move; and if the sensed movement corresponds to any of said second command motions, then generate a control function command signal corresponding to such second command motion for receipt by the apparatus.

27. The method according to claim 26, wherein the first tapping sequence comprises at least one tap followed by a pause followed by at least one tap.

28. The method according to claim 26, wherein the first tapping sequence comprises at least one tap.

29. A method for controlling an apparatus using a wrist mouse, the apparatus comprising a display having a cursor, the method comprising:

mounting a wireless wrist mouse to a user at a chosen hand or at or near a chosen wrist of the user, the wrist mouse comprising a body, a motion sensor and motion circuitry, the motion sensor and motion circuitry carried by the body, the motion circuitry comprising a library of first and second command motions, the first command motions being command motions corresponding to cursor movement directions for controlling movement of the cursor over the display, and the second command motions being command motions corresponding to control functions for the apparatus;

moving the wrist mouse in a chosen manner;

sensing, by said motion sensor, said movement of the wrist mouse;

determining if the sensed movement corresponds to any of said command motions; and if the sensed movement corresponds to any of said first command motions, then generate a cursor movement command signal corresponding to such first command motion for receipt by an apparatus causing a cursor on a display of the apparatus to move;

if the sensed movement corresponds to any of said second command motions, then generate a control function command signal corresponding to such second command motion for receipt by the apparatus;

said command motion for a turn on wrist mouse command signal comprising clockwise motion of the wrist mouse, said motion exceeding one or both of a first threshold velocity or a first threshold acceleration;

said command motion for a turned off wrist mouse command signal comprising counterclockwise motion of the wrist mouse, said motion exceeding one or both of a second threshold velocity or a second threshold acceleration;

said command motion for a zoom in command signal comprising movement of the wrist mouse away from the user generally parallel to the user's forearm and hand, said motion exceeding one or both of a third threshold velocity or a third threshold acceleration; and said command motion for a zoom out command signal comprising movement of the wrist mouse towards the user generally parallel to the user's forearm and hand, said motion exceeding one or both of a fourth threshold velocity or a fourth threshold acceleration.

30. A method for controlling an apparatus using a tap motion sensitive gesture device, the apparatus comprising a display having a cursor, comprising:

supporting a tap motion sensitive gesture device with a chosen body part of a user, the gesture device comprising a body, a motion sensor and motion circuitry, the motion sensor and motion circuitry carried by the body, the motion circuitry comprising a library of command motions;

the library of command motions comprising a library of first and second command motions, the first command motions being command motions corresponding to cursor movement directions for controlling movement of the cursor over the display, and the second command motions being command motions corresponding to control functions for the apparatus;

moving the gesture device in a chosen manner;

the moving step comprising tapping the body of the gesture device to create vibrational movement of the gesture device, the vibrational movement of the gesture device corresponding to any of said command motions being a second command motion;

sensing, by said motion sensor, said vibrational movement of the gesture device;

the movement sensing step comprising sensing vibration created by said tapping;

determining if the sensed vibrational movement corresponds to any of said command motions; and if the sensed vibrational movement corresponds to said any of said command motions, then generate a command signal corresponding to such command motion for receipt by an apparatus.

* * * * *